United States Patent
Arakawa et al.

(10) Patent No.: US 12,455,306 B2
(45) Date of Patent: Oct. 28, 2025

(54) SPECTRUM ANALYSIS PROGRAM, SIGNAL PROCESSING DEVICE, RADAR DEVICE, COMMUNICATION TERMINAL, FIXED COMMUNICATION DEVICE, AND RECORDING MEDIUM

(71) Applicant: Murata Manufacturing Co., Ltd., Kyoto-fu (JP)

(72) Inventors: Nobuya Arakawa, Nagaokakyo (JP); Katsuhisa Kashiwagi, Nagaokakyo (JP); Ryo Saito, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 153 days.

(21) Appl. No.: 18/437,662

(22) Filed: Feb. 9, 2024

(65) Prior Publication Data

US 2024/0183890 A1     Jun. 6, 2024

Related U.S. Application Data

(63) Continuation of application No. PCT/JP2022/028690, filed on Jul. 26, 2022.

(30) Foreign Application Priority Data

Aug. 11, 2021     (JP) .................................. 2021-131071

(51) Int. Cl.
*G01R 23/16* (2006.01)
*G01S 13/34* (2006.01)

(52) U.S. Cl.
CPC .............. *G01R 23/16* (2013.01); *G01S 13/34* (2013.01)

(58) Field of Classification Search
CPC .......... G01R 23/16; G01S 13/34; G01S 7/354
(Continued)

(56) References Cited

U.S. PATENT DOCUMENTS 11,300,655 B2 *   4/2022   Menaker ................. G01S 7/023
12,248,089 B2 *   3/2025   Zoubi ..................... G01S 13/34
(Continued)

FOREIGN PATENT DOCUMENTS

JP      H07-500683 A     1/1995
JP      H09-145461 A     6/1997
(Continued)

OTHER PUBLICATIONS

International Search Report issued in PCT/JP2022/028690; mailed Oct. 4, 2022.
(Continued)

*Primary Examiner* — Giovanni Astacio-Oquendo
(74) *Attorney, Agent, or Firm* — Studebaker Brackett PLLC (57) ABSTRACT

A spectrum analysis program causing a computer system to execute: generating, using an AF method, first frequency spectrum data having continuous frequency values from a wireless signal, generating, using a frequency spectrum analysis method for outputting reference power values for the wireless signal, second frequency spectrum data having discrete frequency values from the wireless signal, pairing, with each other, frequency values that are closest among frequency values of the first frequency spectrum data and frequency values of the second frequency spectrum data, and generating, based on a comparison between a first power value at a first frequency in the first frequency spectrum data and a second power value at a second frequency corresponding to the first frequency in the second frequency spectrum data, frequency spectrum data serving as an analysis result.

8 Claims, 10 Drawing Sheets

(58) Field of Classification Search
USPC .............................. 324/76.19, 76.12, 76.11
See application file for complete search history.

(56) References Cited

U.S. PATENT DOCUMENTS

2013/0039451 A1   2/2013  Perthold
2024/0219551 A1*  7/2024  Sasaki ................... G01S 13/345

FOREIGN PATENT DOCUMENTS

| JP | 2000-121716 A | 4/2000 |
| JP | 2001-349941 A | 12/2001 |
| JP | 2009-014405 A | 1/2009 |
| JP | 2013-51675 A | 3/2013 |
| WO | 2021/210489 A1 | 10/2021 |

OTHER PUBLICATIONS

Obata et al.; "In DOA estimation method using Annihilating Filter Discrimination method between real and virtual images"; 2021 IEICE Communication Society Conference; Sep. 2021; pp. 1-5.

* cited by examiner

SPECTRUM ANALYSIS PROGRAM, SIGNAL PROCESSING DEVICE, RADAR DEVICE, COMMUNICATION TERMINAL, FIXED COMMUNICATION DEVICE, AND RECORDING MEDIUM

CROSS-REFERENCE TO RELATED APPLICATIONS

This application claims benefit of priority to International Patent Application No. PCT/JP2022/028690, filed Jul. 26, 2022, and to Japanese Patent Application No. 2021-131071, filed Aug. 11, 2021, the entire contents of each are incorporated herein by reference.

BACKGROUND

Technical Field

The present disclosure relates to a spectrum analysis program, a signal processing device, a radar device, a communication terminal, fixed communication device, and a recording medium.

Background Art

The multiple signal classification (MUSIC) method is known as a high-resolution algorithm for estimating the direction of arrival of radio waves, for example. Japanese Unexamined Patent Application Publication No. 2000-121716 describes a method for receiving a plurality of incoming waves from individual directions via a plurality of antennas arranged at different positions from each other and for estimating, using the MUSIC method, the number of incoming waves and the direction of arrival of the incoming waves from the reception signals of the respective antennas.

SUMMARY

However, the method described in Japanese Unexamined Patent Application Publication No. 2000-121716 has a problem in that it is difficult to distinguish between actual incoming waves and false waves because many false waves appear when the number of estimated waves is larger than the number of actual incoming waves, and some of the false waves may have power higher than or equal to a threshold value.

Therefore, the present disclosure provides an analysis method that can solve such a problem and increase the estimation accuracy of power values of frequency spectrum data, having high resolution, of a wireless signal.

A spectrum analysis program related to the present disclosure causes a computer to execute generating, using an annihilating filter method, first frequency spectrum data from a received wireless signal, generating, using a frequency spectrum analysis method different from the annihilating filter method, second frequency spectrum data from the wireless signal, pairing, with each other, frequency values that are closest among frequency values of the first frequency spectrum data and frequency values of the second frequency spectrum data, and generating, based on a comparison between a first power value at a first frequency in the first frequency spectrum data and a second power value at a second frequency corresponding to the first frequency in the second frequency spectrum data, frequency spectrum data serving as an analysis result. The first power value is used as a power value at the first frequency in the frequency spectrum data serving as the analysis result in a case where the first power value is less than or equal to the second power value, and the second power value is used as a power value at the first frequency in the frequency spectrum data serving as the analysis result in a case where the second power value is less than the first power value.

According to the present disclosure, the estimation accuracy of power values of frequency spectrum data, having high resolution, of a wireless signal can be increased.

DETAILED DESCRIPTION

In the following, embodiments of the present disclosure will be described with reference to the individual drawings. Here, identical symbols indicate identical components, and redundant description is omitted.

Figure 1:
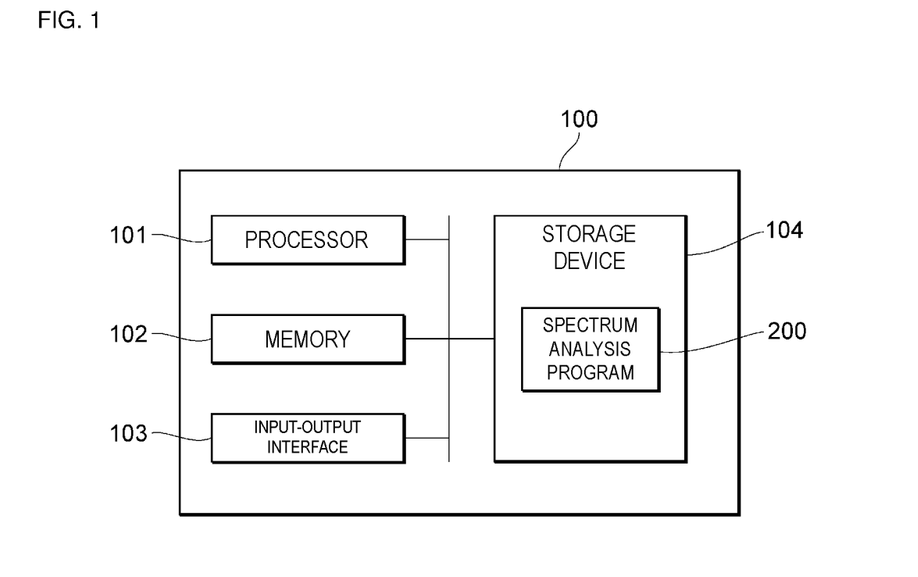
FIG. 1 is an explanatory diagram illustrating a hardware configuration of a signal processing device related to an embodiment of the present disclosure.

FIG. 1 is an explanatory diagram illustrating a hardware configuration of a signal processing device 100 related to an embodiment of the present disclosure. The signal processing device 100 is a computer including a processor 101 for performing digital signal processing (DSP) processing, a memory 102, an input-output interface 103, and a storage device 104. In the storage device 104, a spectrum analysis program 200 related to an embodiment of the present disclosure is stored. The spectrum analysis program 200 is a program for causing the processor 101 to perform a spectrum analysis method related to an embodiment of the present disclosure. The spectrum analysis program 200 is read from the storage device 104, loaded into the memory 102, and then executed by the processor 101. Into the input-output interface 103, an A/D converted wireless signal (a wireless signal that is received by an antenna (not illustrated in FIG. 1) and is then A/D converted) is input. The processor 101 receives the A/D converted wireless signal through the input-output interface 103, performs the spectrum analysis method related to an embodiment of the present disclosure to generate frequency spectrum data serving as an analysis result, and outputs the generated frequency spectrum data through the input-output interface 103. Note that the frequency spectrum includes the amplitude spectrum and the phase spectrum.

Figure 2:
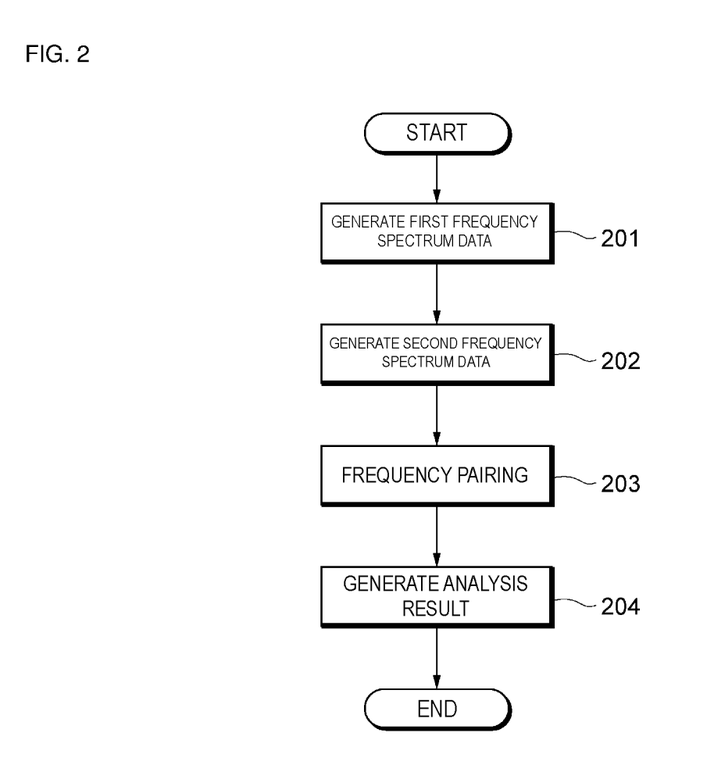
FIG. 2 is a flowchart illustrating the procedure of processing in a spectrum analysis method related to an embodiment of the present disclosure.

FIG. 2 is a flowchart illustrating the procedure of processing in the spectrum analysis method related to an embodiment of the present disclosure.

In Step 201, the processor 101 generates, from a wireless signal, first frequency spectrum data having continuous frequency values using an annihilating filter (AF) method.

In Step 202, the processor 101 generates second frequency spectrum data having discrete frequency values using a frequency spectrum analysis method (a frequency spectrum analysis method different from the AF method) that outputs reference power values for the wireless signal. The frequency spectrum analysis method that outputs reference power values for the wireless signal is a frequency spectrum analysis method with high accuracy in power value estimation (for example, a discrete Fourier transform such as Fast Fourier Transform, a Beamformer method, or the Capon method).

In Step 203, the processor 101 pairs, with each other, frequency values that are closest among frequency values of the first frequency spectrum data and frequency values of the second frequency spectrum data (frequency pairing). "Pairs, with each other, frequency values that are closest among . . . " means, for example, linking (or associating) a first frequency of the first frequency spectrum data with a second frequency of the second frequency spectrum data in a case where a specific frequency of the first frequency spectrum data is treated as the first frequency, and the frequency that is closest to the first frequency in the second frequency spectrum data is treated as the second frequency. Such linking (or associating) is called pairing in the present specification.

In Step 204, the processor 101 generates frequency spectrum data serving as an analysis result, on the basis of a comparison between a first power value at the first frequency in the first frequency spectrum data and a second power value at the second frequency corresponding to the first frequency in the second frequency spectrum data. For example, in a case where the first power value is less than or equal to the second power value, the processor 101 treats the first power value as a power value at the first frequency in the frequency spectrum data serving as the analysis result. For example, in a case where the second power value is less than the first power value, the processor 101 treats the second power value as a power value at the first frequency in the frequency spectrum data serving as the analysis result.

In the following, details of processing in Step 204 will be described with reference to FIGS. 3 and 4. A mark D1 indicates first frequency spectrum data at a first frequency f1. A mark D2 indicates second frequency spectrum data at a second frequency f2. The first frequency f1 and the second frequency f2 are paired with each other through processing in Step 203. The first frequency f1 and the second frequency f2 may be the same frequency as each other or different frequencies from each other. Note that in a case where the first frequency f1 and the second frequency f2 have the same frequency value as each other, the values at the same specific frequency are paired with each other.

Figure 3:
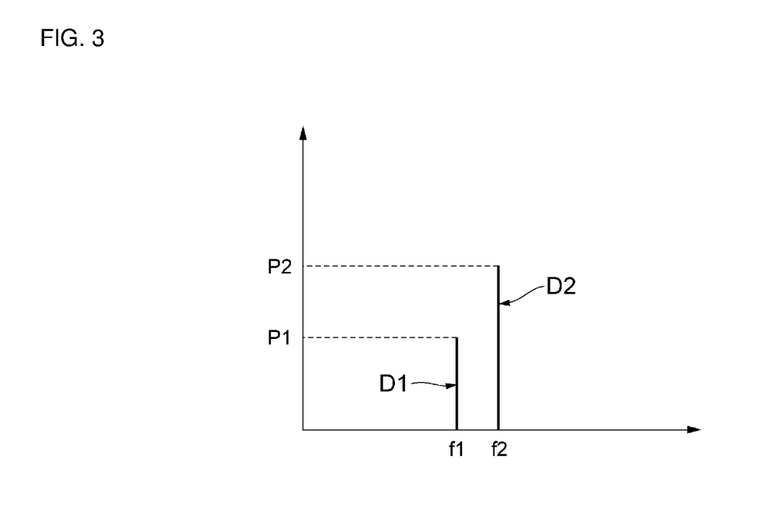
FIG. 3 is an explanatory diagram of the spectrum analysis method related to an embodiment of the present disclosure.

As illustrated in FIG. 3, in a case where a first power value P1 of the first frequency spectrum data D1 at the first frequency f1 is less than a second power value P2 of the second frequency spectrum data D2 at the second frequency f2, the first power value P1 is treated as a power value at the first frequency f1 in the frequency spectrum data serving as the analysis result. That is, the first frequency spectrum data D1 at the first frequency f1 is treated as frequency spectrum data, which serves as the analysis result, at the first frequency f1.

Figure 4:
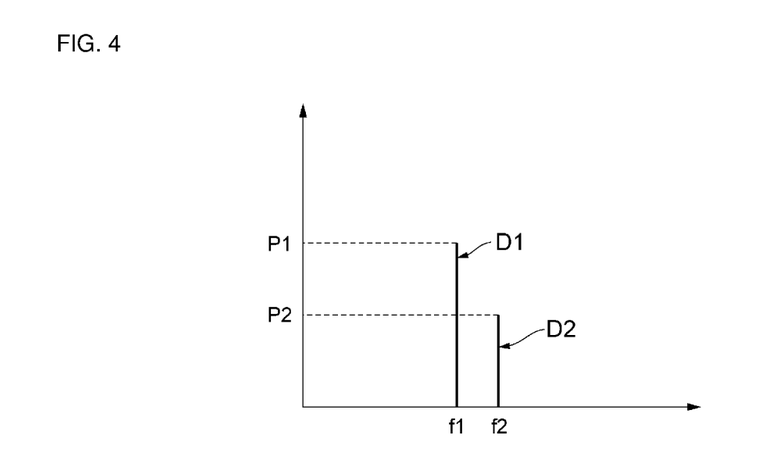
FIG. 4 is an explanatory diagram of the spectrum analysis method related to an embodiment of the present disclosure.

In contrast, as illustrated in FIG. 4, in a case where the second power value P2 of the second frequency spectrum data D2 at the second frequency f2 is less than or equal to the first power value P1 of the first frequency spectrum data D1 at the first frequency f1, the second power value P2 is treated as a power value at the first frequency f1 in the frequency spectrum data serving as the analysis result. That is, the data obtained by correcting the power value of the first frequency spectrum data D1 at the first frequency f1 (the data corrected from the first power value P1 to the second power value P2) is treated as frequency spectrum data, which serves as the analysis result, at the first frequency f1.

In this manner, the frequency spectrum data serving as the analysis result is generated by performing, for each frequency of the first frequency spectrum data, processing for correcting the power value of the first frequency spectrum data on the basis of a comparison between the power value of the first frequency spectrum data and the power value, which is for reference, of the second frequency spectrum data.

According to the spectrum analysis method related to an embodiment of the present disclosure, it is possible to generate frequency spectrum data that has both high frequency resolution based on the AF method and high estimation accuracy of power value. In particular, it is possible to generate frequency spectrum data having high resolution and highly reliable power values even when the actual number of incoming waves changes. In addition, even in situations, such as mobile communications, where the phase of wireless radio waves changes from measurement to measurement, it is possible to distinguish between true and false waves with high accuracy.

Note that the spectrum analysis program 200 has instructions that cause the signal processing device 100 to execute Steps 201 to 204 individually. The signal processing device 100 serves as means of executing the individual Steps 201 to 204. Functions similar to those of these respective means may be realized using dedicated hardware resources (for example, an application-specific integrated circuit (ASIC), a field programmable gate array (FPGA), and so forth) or firmware.

Figure 5:
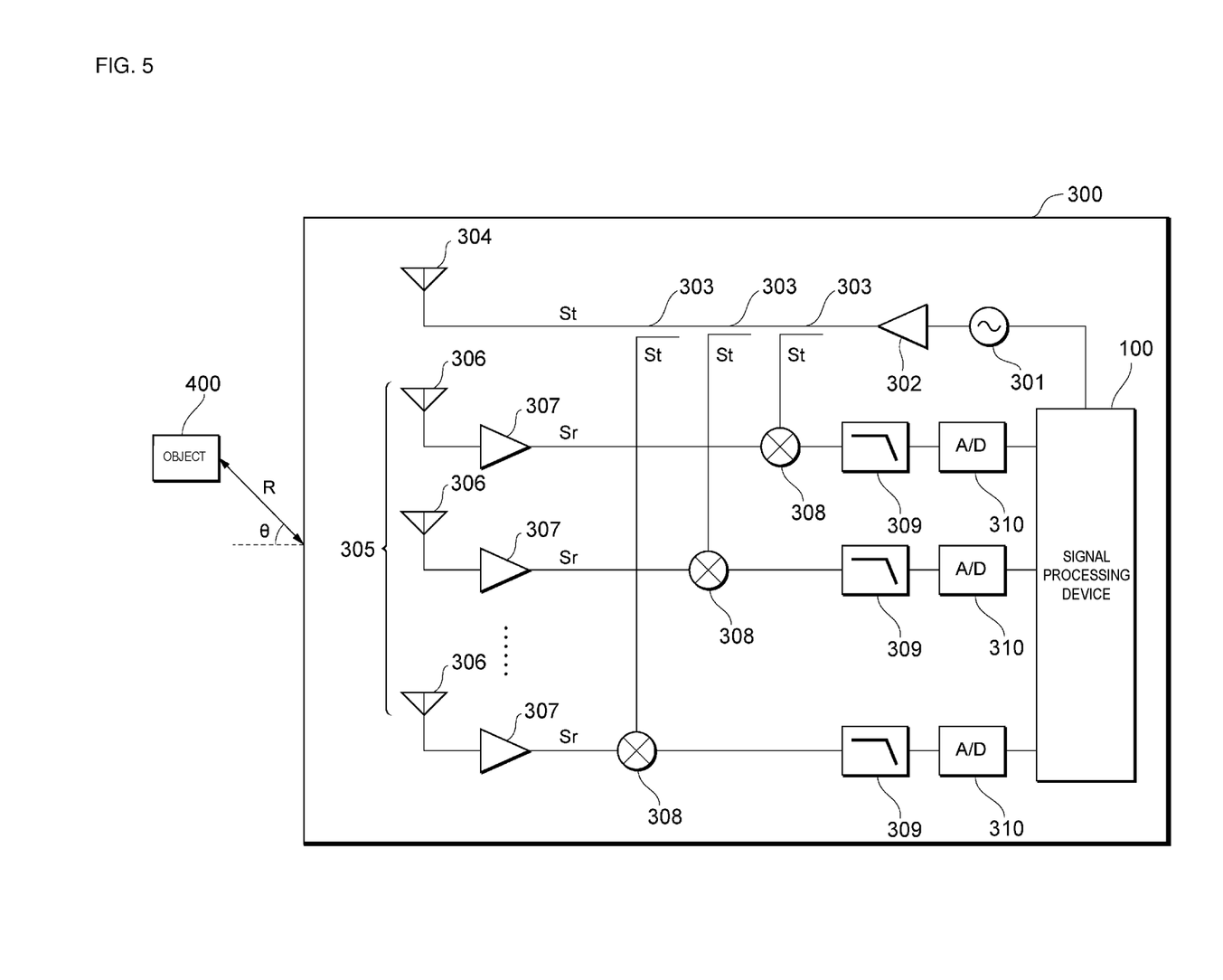
FIG. 5 is an explanatory diagram illustrating the configuration of a radar device related to an embodiment of the present disclosure.

FIG. 5 is an explanatory diagram illustrating the configuration of a radar device 300 related to an embodiment of the present disclosure. The radar device 300 is a frequency modulated continuous wave radar (an FM-CW radar), which is a type of continuous wave radar that uses a frequency modulation method. The radar device 300 can measure, for example, the relative position of an object 400 with respect to the radar device 300 (for example, an angle θ of the object 400 with respect to the radar device 300 and a distance R between the radar device 300 and the object 400). The radar device 300 includes an oscillator 301, an amplifier 302, a plurality of splitters 303, a transmission antenna 304, a reception antenna 305, a plurality of amplifiers 307, a plurality of mixers 308, a plurality of filters 309, a plurality of A/D converters 310, and the signal processing device 100.

The oscillator 301 generates and outputs a transmission signal St. The oscillator 301 is a voltage controlled oscillator, for example. The amplifier 302 amplifies the power of the transmission signal St output from the oscillator 301. The splitters 303 distribute the transmission signal St, which is output from the amplifier 302 and has amplified power, to the transmission antenna 304 and the mixers 308. The transmission signal St that is output from the amplifier 302, has amplified power, and is distributed to each mixer 308 is also called a local signal. The transmission antenna 304 transmits the transmission signal St as radar waves.

The reception antenna 305 is a linear array antenna with a plurality of antenna elements 306, which are arranged at equal intervals. The reception antenna 305 receives, as a reception signal Sr, reflected waves of the transmission signal St reflected by the object 400. Each amplifier 307 amplifies the reception signal Sr output from the antenna element 306. Each mixer 308 mixes the amplified reception signal Sr output from the amplifier 307 and the transmission signal St distributed by the splitter 303 to generate and output an intermediate frequency signal. The intermediate frequency signal is a beat signal that indicates the frequency difference between the transmission signal St and the reception signal Sr. Each filter 309 is a low pass filter that removes unnecessary signal components of the intermediate frequency signal output from the mixer 308. Each A/D converter 310 converts the intermediate frequency signal output from the filter 309 from analog to digital.

The signal processing device 100 performs, in accordance with the spectrum analysis method related to an embodiment of the present disclosure, signal processing on the intermediate frequency signals that are converted into digital signals by the respective A/D converters 310 to estimate any one of the distance R, the angle θ, and the speed (a change in the distance R per unit time) of the object 400. For example, the signal processing device 100 performs signal processing by treating "the intermediate frequency signals that are converted into digital signals by the respective A/D converters 310" as the "wireless signal" in Steps 201 to 204 of FIG. 2, and estimates any one of the distance R, the angle θ, and the speed (a change in the distance R per unit time) of the object 400 from the frequency spectrum data serving as the analysis result.

Note that the number of splitters 303, that of amplifiers 307, that of mixers 308, that of filters 309, and that of A/D converters 310 are each equal to the number of antenna elements 306.

Figure 6:
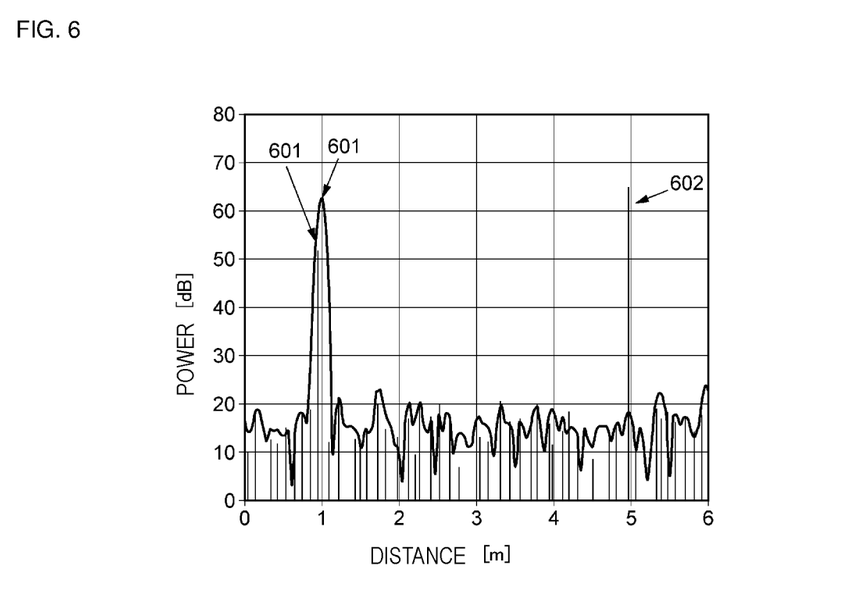
FIG. 6 is a graph illustrating an analysis result based on an existing AF method.
Figure 7:
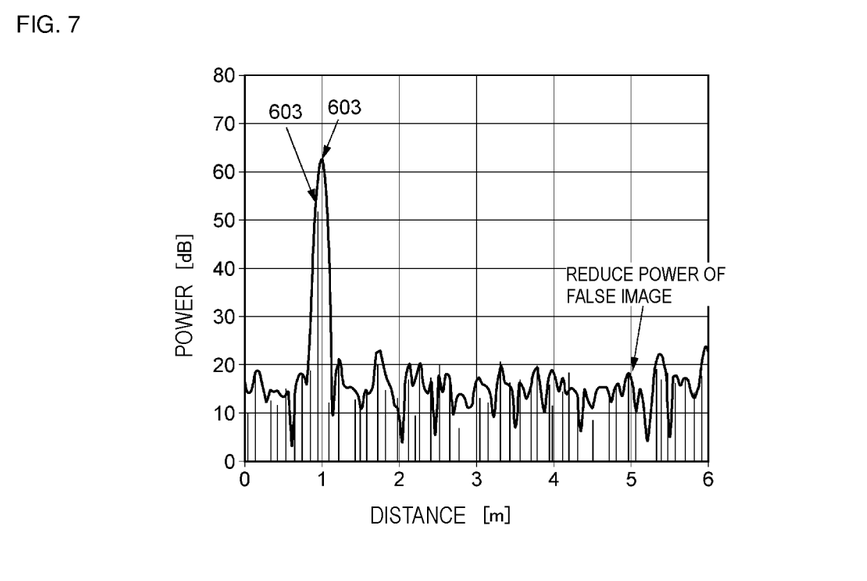
FIG. 7 is a graph illustrating an analysis result based on the spectrum analysis method related to an embodiment of the present disclosure.

As the algorithm executed by the signal processing device 100, the AF method was used to generate the first frequency spectrum data, and the discrete Fourier transform method was used to generate the second frequency spectrum data. FIG. 6 is a graph illustrating an analysis result for a case where these generated first and second frequency spectrum data are superposed with each other. As illustrated in FIG. 6, in addition to incoming waves 601 from the object 400 serving as a target, false waves 602 having a high power value are generated. FIG. 7 is a graph illustrating an analysis result for a case where the spectrum analysis method related to an embodiment of the present disclosure is used as the algorithm executed by the signal processing device 100. As illustrated in FIG. 7, except for incoming waves 603 from the object 400 serving as the target, no false wave having a high power value is generated, so that it can be seen that the power of the false waves is effectively reduced.

Figure 8:
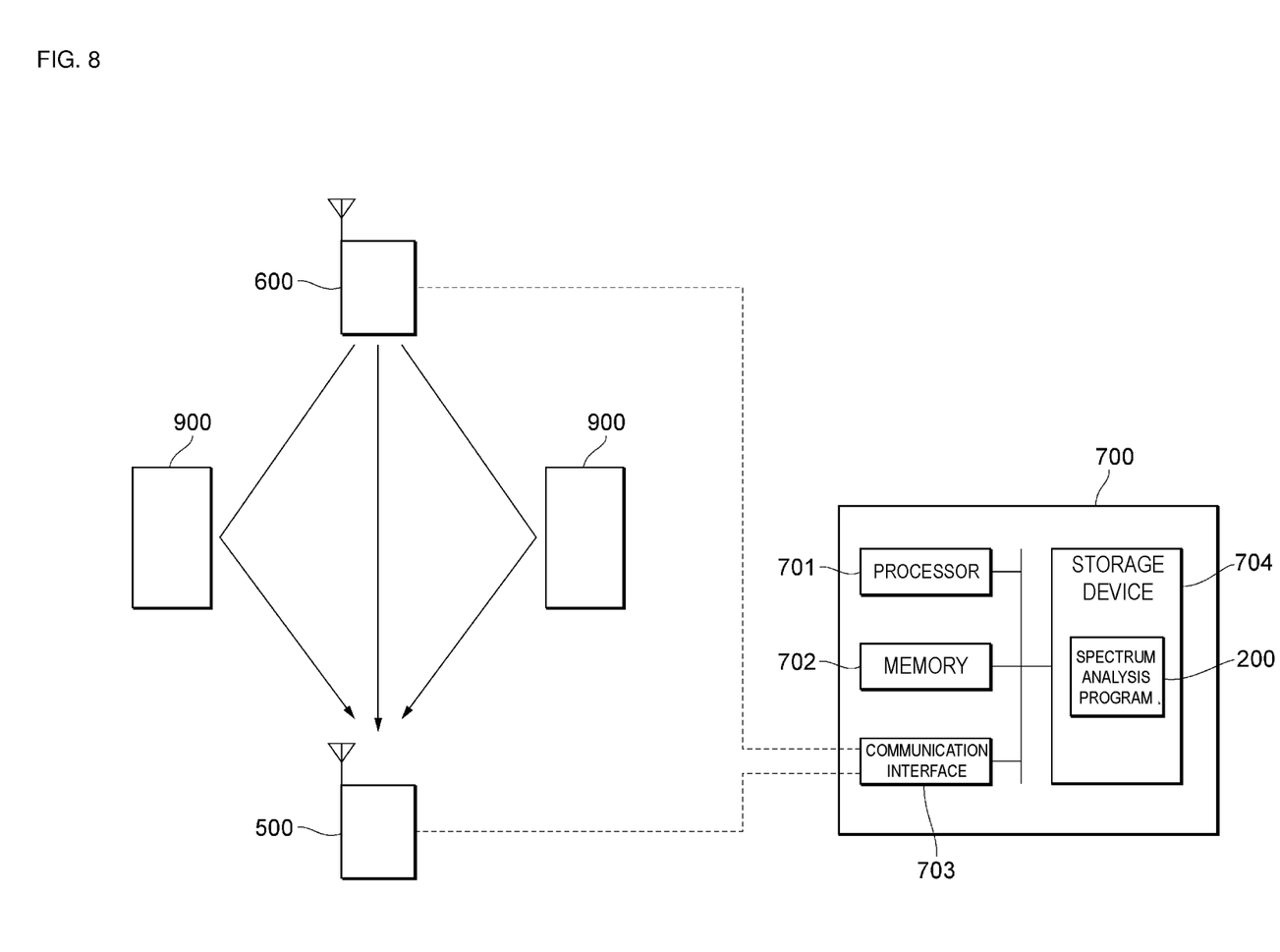
FIG. 8 is an explanatory diagram of a communication terminal related to an embodiment of the present disclosure.

FIG. 8 is an explanatory diagram of a communication terminal 500 related to an embodiment of the present disclosure. Some radio waves from a base station 600 may be received by a communication terminal 500 after being reflected by obstacles 900, such as buildings. In addition, some radio waves from the base station 600 may be received by the communication terminal 500 without being reflected by the obstacles 900, such as buildings. The communication terminal 500 estimates the direction of arrival of radio waves from the base station 600 and directs the peak of the directivity of the antenna in the estimated direction. Note that a server device 700 will be described below.

Figure 9:
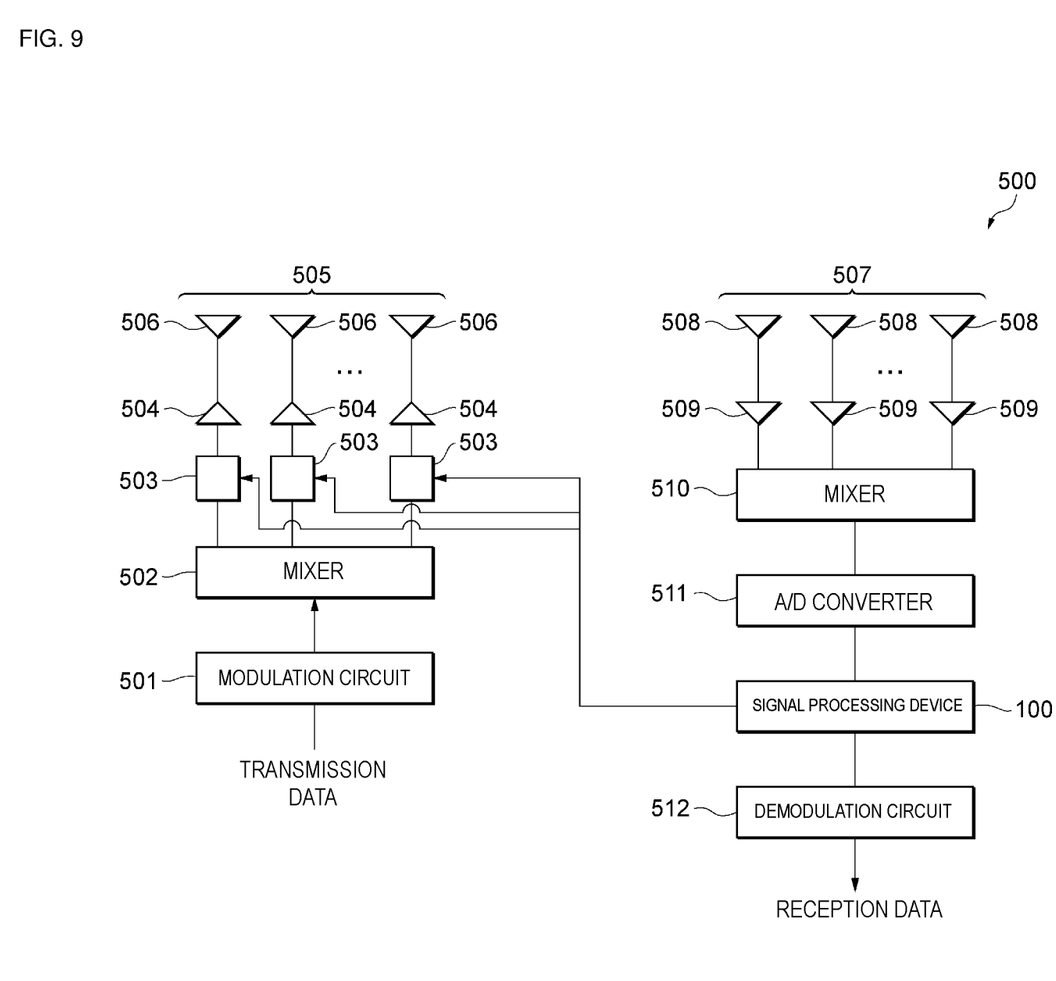
FIG. 9 is an explanatory diagram illustrating the configuration of the communication terminal related to an embodiment of the present disclosure.

FIG. 9 is an explanatory diagram illustrating the configuration of the communication terminal 500 related to an embodiment of the present disclosure. The communication terminal 500 includes a modulation circuit 501, a mixer 502, a plurality of phase shifters 503, a plurality of amplifiers 504, a transmission antenna 505, a reception antenna 507, a plurality of amplifiers 509, a mixer 510, an A/D converter 511, the signal processing device 100, and a demodulation circuit 512. The transmission antenna 505 and the reception antenna 507 may be shared by using a circulator or a switch.

Transmission data is modulated by the modulation circuit 501, and a signal carrying information regarding the transmission data is up-converted by the mixer 502. The transmission antenna 505 is a linear array antenna with a plurality of antenna elements 506, which are arranged at equal intervals. Each phase shifter 503 controls the phase of a radio frequency signal fed to the antenna element 506 so that the peak of the directivity of the transmission antenna 505 is directed toward the base station 600. The transmission antenna 505 transmits a wireless signal that carries the information regarding the transmission data.

The reception antenna 507 is a linear array antenna with a plurality of antenna elements 508, which are arranged at equal intervals. The wireless signal received by the respective antenna elements 508 is amplified by the amplifiers 509, down-converted by the mixer 510, and converted from analog to digital by the A/D converter 511.

The signal processing device 100 performs, in accordance with the spectrum analysis method related to an embodiment of the present disclosure, signal processing on the wireless signal that is converted into a digital signal by the A/D converter 511 to estimate the direction of arrival of the wireless signal. For example, the signal processing device 100 performs signal processing by treating "the wireless signal that is converted into a digital signal by the A/D converter 511" as the "wireless signal" in Steps 201 to 204 of FIG. 2, and estimates the direction of arrival of the wireless signal (the azimuth angle and elevation angle of the base station 600 with respect to the communication terminal 500) from the frequency spectrum data serving as the analysis result. The signal processing device 100 calculates the amount of phase shift for each phase shifter 503 such that the peak of the directivity of the transmission antenna 505 is directed toward the base station 600, and outputs the result of the calculation to the phase shifter 503.

The signal processing device 100 performs digital beam forming (DBF) processing on the wireless signal converted into a digital signal by each A/D converter 511 to perform beam synthesis. From the result of beam synthesis, the demodulation circuit 512 demodulates reception data.

The description now returns to the description of FIG. 8. In the above-described description, an example is illustrated in which the communication terminal 500 receives a wireless signal from the base station 600 and processes the received signal in accordance with the spectrum analysis method related to an embodiment of the present disclosure to estimate the direction of arrival of the wireless signal from the frequency spectrum data serving as the analysis result.

However, the present disclosure is not limited to such an example. For example, the communication terminal 500 may transfer, to the server device 700, the wireless signal received from the base station 600 and request the server device 700 to estimate the direction of arrival of the wireless signal.

The server device 700 is, for example, a general-purpose computer system such as a cloud server. The server device 700 includes a processor 701, a memory 702, a communication interface 703, and a storage device 704. In the storage device 704, a spectrum analysis program 200 related to an embodiment of the present disclosure is stored. The spectrum analysis program 200 is read from the storage device 704, loaded into the memory 702, and then executed by the processor 701.

In response to the request from the communication terminal 500, the server device 700 performs, in accordance with the spectrum analysis method related to an embodiment of the present disclosure, signal processing on the wireless signal received from the communication terminal 500 to estimate the direction of arrival of the wireless signal. The server device 700 transmits an estimation result of the direction of arrival of the wireless signal to the communication terminal 500. The communication terminal 500 having received the estimation result of the direction of arrival of the wireless signal directs the peak of the directivity of the antenna on the basis of the estimation result.

Figure 10:
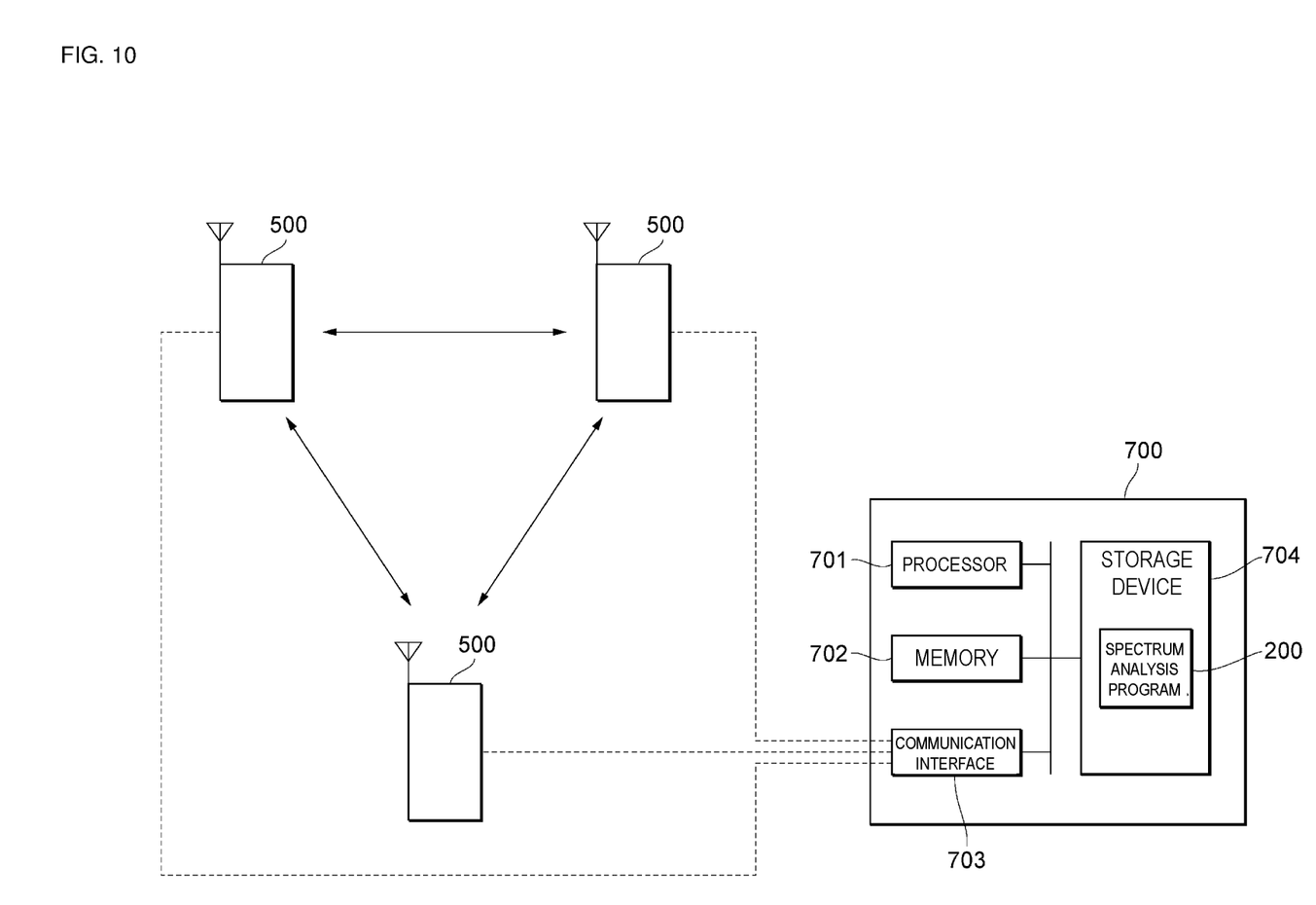
FIG. 10 is an explanatory diagram of a communication terminal related to an embodiment of the present disclosure.

In the above-described description, an example is illustrated in which the communication terminal 500 estimates the direction of arrival of radio waves from the base station 600 and directs the peak of the directivity of the antenna in the estimated direction. However, the present disclosure is not limited to such an example. For example, as illustrated in FIG. 10, any one of a plurality of communication terminals 500 may estimate the direction of arrival of radio waves from another communication terminal 500 and direct the peak of the directivity of the antenna in the estimated direction. The hardware configuration of one communication terminal 500 that estimates the direction of arrival of radio waves from another communication terminal 500 is the same as that illustrated in FIG. 9, so detailed description is omitted.

For example, one communication terminal 500 may transfer, to the server device 700, a wireless signal received from another communication terminal 500 and request the server device 700 to estimate the direction of arrival of the wireless signal. In response to the request from the communication terminal 500, the server device 700 performs, in accordance with the spectrum analysis method related to an embodiment of the present disclosure, signal processing on the wireless signal received from the communication terminal 500 to estimate the direction of arrival of the wireless signal. The server device 700 transmits an estimation result of the direction of arrival of the wireless signal to the communication terminal 500. The communication terminal 500 having received the estimation result of the direction of arrival of the wireless signal directs the peak of the directivity of the antenna on the basis of the estimation result.

Figure 11:
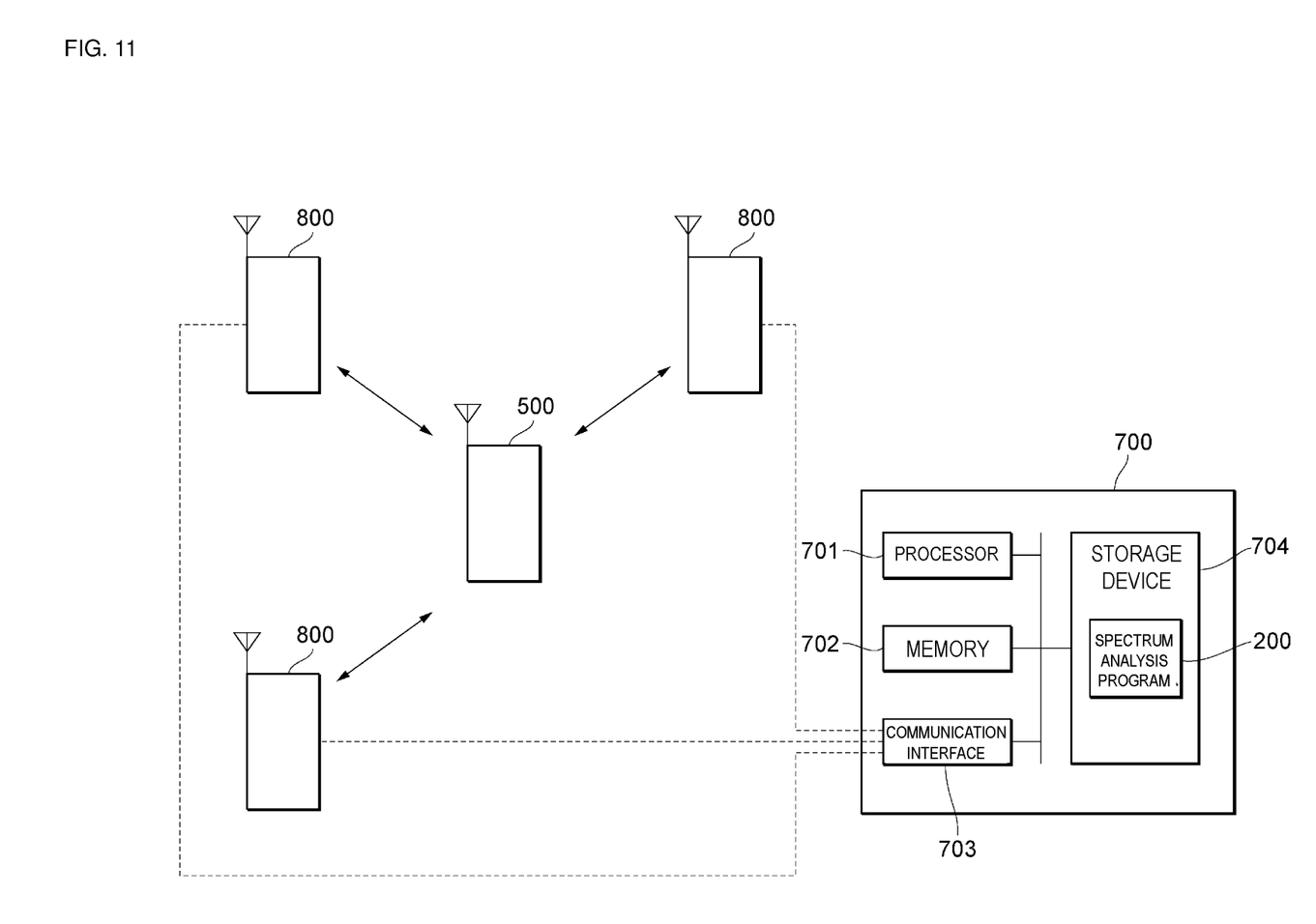
FIG. 11 is an explanatory diagram of fixed communication devices related to an embodiment of the present disclosure.

FIG. 11 is an explanatory diagram of fixed communication devices 800 related to an embodiment of the present disclosure. The fixed communication devices 800 are base stations that serve as access points for short-range wireless connection with the communication terminal 500. The communication terminal 500 and each fixed communication device 800 are, for example, synchronized in terms of time in advance through a Global Positioning System (GPS) system. The communication terminal 500 transmits a wireless signal at predetermined intervals. The fixed communication device 800 estimates the time of reception of a wireless signal transmitted from the communication terminal 500 and estimates the distance between the communication terminal 500 and the fixed communication device 800 from the difference between the time of transmission of the wireless signal from the communication terminal 500 and the time of reception of the wireless signal by the fixed communication device 800. By executing such an estimation process by each fixed communication device 800, the position of the communication terminal 500 can be obtained using the method of triangulation.

Figure 12:
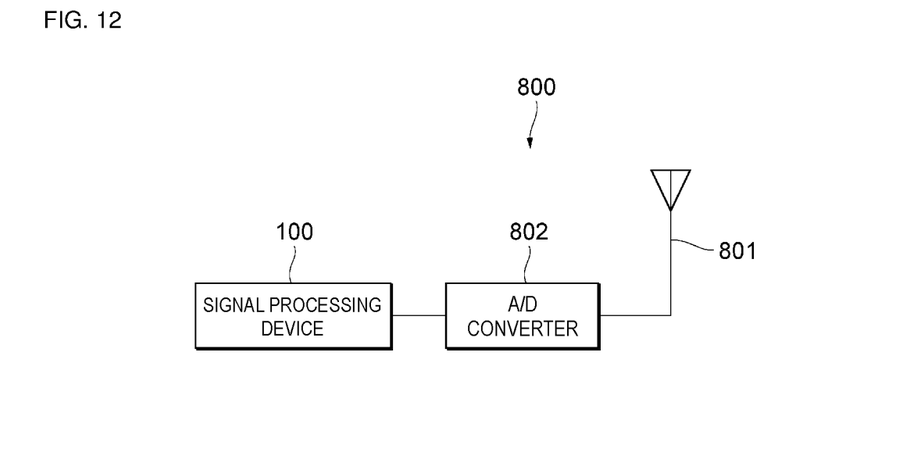
FIG. 12 is an explanatory diagram illustrating the configuration of a fixed communication device related to an embodiment of the present disclosure.

FIG. 12 is an explanatory diagram illustrating the configuration of the fixed communication device 800 related to an embodiment of the present disclosure. The fixed communication device 800 includes a reception antenna 801, an A/D converter 802, and the signal processing device 100. The reception antenna 801 receives a wireless signal from the communication terminal 500. The A/D converter 802 converts the wireless signal received by the reception antenna 801 from analog to digital. The signal processing device 100 estimates the time of reception of the wireless signal transmitted from the communication terminal 500 by performing signal processing on the A/D converted wireless signal in accordance with the spectrum analysis method related to an embodiment of the present disclosure. For example, the signal processing device 100 performs signal processing by treating "the wireless signal that is converted into a digital signal by the A/D converter 802" as the "wireless signal" in Steps 201 to 204 of FIG. 2, reproduces the original time signal from the phase-resolved data (spectrum), and estimates the time of reception of the wireless signal transmitted from the communication terminal 500.

Figure 13A:
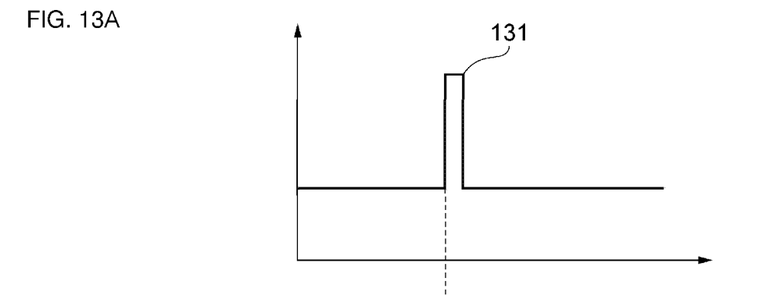
FIGS. 13A and 13B are explanatory diagrams of wireless signals related to an embodiment of the present disclosure.
Figure 13B:
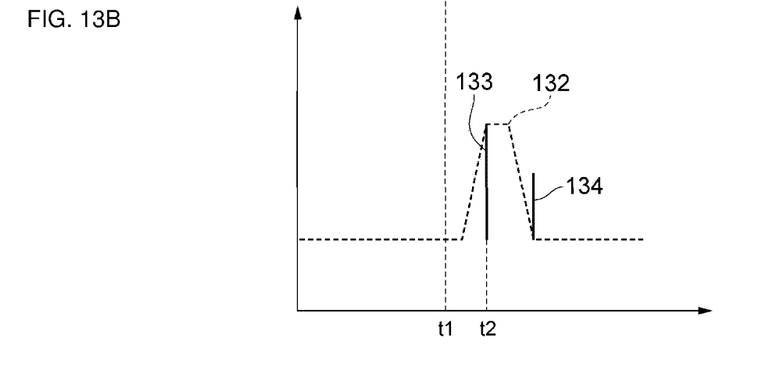

FIG. 13A illustrates a wireless signal 131 transmitted from the communication terminal 500 at a time t1. FIG. 13B illustrates the wireless signal received by the fixed communication device 800. A wireless signal 132 is reproduced using the fast Fourier transform, and wireless signals 133 and 134 are reproduced using the AF method. The power of the wireless signal 134 reproduced using the AF method is higher than that of the wireless signal 132 reproduced using the fast Fourier transform, and thus the wireless signal 134 reproduced using the AF method is a false wave. The signal processing device 100 estimates, on the basis of the wireless signal 133 reproduced using the AF method, a time t2 of reception of the wireless signal transmitted from the communication terminal 500. The signal processing device 100 estimates the distance between the communication terminal 500 and the fixed communication device 800 from the difference between the time t1 of transmission of the wireless signal from the communication terminal 500 and the time t2 of reception of the wireless signal by the fixed communication device 800.

The description now returns to the description of FIG. 11. In the above-described description, an example is illustrated in which the fixed communication device 800 estimates the time of reception of a wireless signal transmitted from the communication terminal 500 and estimates the distance between the communication terminal 500 and the fixed communication device 800 from the difference between the time of transmission of the wireless signal from the communication terminal 500 and the time of reception of the wireless signal by the fixed communication device 800. However, the present disclosure is not limited to such an example. For example, the fixed communication device 800 may transfer, to the server device 700, the wireless signal transmitted from the communication terminal 500 and request the server device 700 to estimate the time at which the fixed communication device 800 received the wireless signal transmitted from the communication terminal 500. In response to the request from the fixed communication device 800, the server device 700 performs, in accordance with the spectrum analysis method related to an embodiment of the present disclosure, signal processing on the wireless signal received from the communication terminal 500 by the fixed communication device 800 to estimate the time at which the fixed communication device 800 received the wireless signal transmitted from the communication terminal 500. The server device 700 transmits an estimation result of the time of reception to the fixed communication device 800. The fixed communication device 800 having received the estimation result of the time of reception estimates the distance between the communication terminal 500 and the fixed communication device 800 on the basis of the estimation result.

Note that the server device 700 may download the spectrum analysis program 200 through a network and store this in the storage device 704. Alternatively, the server device 700 may install, into the storage device 704, the spectrum analysis program 200 recorded in a computer readable recording medium. The computer readable recording medium is, for example, any recording medium such as a magneto-optical recording medium, a magnetic recording medium, or a semiconductor memory.

Note that the embodiments described above are intended to facilitate understanding of the present disclosure and are not intended to interpret the present disclosure in a limited manner. The present disclosure may be changed or improved without departing from its gist, and the present disclosure includes its equivalents. That is, the embodiments with appropriate design changes made by those skilled in the art are also included in the scope of the present disclosure as long as they have the features of the present disclosure. The elements of the embodiments can be combined to the extent technically possible, and the combinations of these elements are also included in the scope of the present disclosure as long as they include the features of the present disclosure.

What is claimed is:

1. A non-transitory computer-readable recording medium storing a spectrum analysis program causing a computer to execute:
   generating, using an annihilating filter method, first frequency spectrum data from a received wireless signal;
   generating, using a frequency spectrum analysis method different from the annihilating filter method, second frequency spectrum data from the wireless signal;
   pairing, with each other, frequency values that are closest among frequency values of the first frequency spectrum data and frequency values of the second frequency spectrum data; and
   generating, based on a comparison between a first power value at a first frequency in the first frequency spectrum data and a second power value at a second frequency corresponding to the first frequency in the second frequency spectrum data, frequency spectrum data indicating an analysis result, wherein the first power value is used as a power value at the first frequency in the frequency spectrum data indicating the analysis result in a case where the first power value is less than or equal to the second power value, and the second power value is used as a power value at the first frequency in the frequency spectrum data indicating the analysis result in a case where the second power value is less than the first power value.

2. The non-transitory computer-readable recording medium storing a spectrum analysis program according to claim 1, wherein
   the frequency values of the second frequency spectrum data are discrete values.

3. The non-transitory computer-readable recording medium storing a spectrum analysis program according to claim 2, wherein
   the frequency spectrum analysis method different from the annihilating filter method is a discrete Fourier transform.

4. The non-transitory computer-readable recording medium storing a spectrum analysis program according to claim 1, wherein
   the frequency spectrum analysis method different from the annihilating filter method is a discrete Fourier transform.

5. A signal processing device comprising:
   a processor configured to
   generate, using an annihilating filter method, first frequency spectrum data from a received wireless signal;
   generate, using a frequency spectrum analysis method different from the annihilating filter method, second frequency spectrum data from the wireless signal;
   pair, with each other, frequency values that are closest among frequency values of the first frequency spectrum data and frequency values of the second frequency spectrum data; and
   generate, based on a comparison between a first power value at a first frequency in the first frequency spectrum data and a second power value at a second frequency corresponding to the first frequency in the second frequency spectrum data, frequency spectrum data indicating an analysis result, wherein the first power value is used as a power value at the first frequency in the frequency spectrum data indicating the analysis result in a case where the first power value is less than or equal to the second power value, and the second power value is used as a power value at the first frequency in the frequency spectrum data indicating the analysis result in a case where the second power value is less than the first power value.

6. A radar device comprising:
   the signal processing device according to claim 5;
   a transmission antenna configured to transmit a transmission signal to an object;
   a reception antenna configured to receive, as a reception signal, a reflected wave of the transmission signal reflected by the object; and
   a mixer configured to mix the transmission signal and the reception signal to output an intermediate frequency signal indicating a frequency difference between the transmission signal and the reception signal;
   wherein the signal processing device is configured to generate frequency spectrum data indicating the analysis result by treating the intermediate frequency signal as the wireless signal, and estimate, based on the frequency spectrum data indicating the analysis result, any one of a speed, a distance, and an angle of the object.

7. A communication terminal comprising:
   a reception antenna that receives a wireless signal from a base station or another communication terminal; and
   the signal processing device according to claim 5, configured to estimate a direction of arrival of the wireless signal from the frequency spectrum data indicating the analysis result.

8. A fixed communication device comprising:
a reception antenna configured to receive a wireless signal from a communication terminal; and
the signal processing device according to claim 5, wherein
the processor of the signal processing device is configured to estimate, from the frequency spectrum data indicating the analysis result, a time of reception of the wireless signal by the reception antenna, and estimate a distance between the communication terminal and the fixed communication device from a difference between a time of transmission of the wireless signal from the communication terminal and the time of reception of the wireless signal by the reception antenna.

* * * * *